(12) United States Patent
Gonzales et al.

(10) Patent No.: US 9,174,247 B2
(45) Date of Patent: Nov. 3, 2015

(54) CLEANING IMPLEMENT COMPRISING ELASTIC COMPRESSED FOAM

(71) Applicant: The Procter & Gamble Company, Cincinnati, OH (US)

(72) Inventors: Denis Alfred Gonzales, Brussels (BE); Geert Andre Deleersnyder, Wielsbeke (BE); Peter Nessel, Ludwigshafen (DE); Tobias Heinz Steinke, Speyer (DE)

(73) Assignee: The Procter & Gamble Company, Cincinnati, OH (US)

( * ) Notice: Subject to any disclaimer, the term of this patent is extended or adjusted under 35 U.S.C. 154(b) by 77 days.

(21) Appl. No.: 14/060,705

(22) Filed: Oct. 23, 2013

(65) Prior Publication Data

US 2014/0048101 A1 Feb. 20, 2014

Related U.S. Application Data

(63) Continuation of application No. 13/096,333, filed on Apr. 28, 2011, now abandoned.

(30) Foreign Application Priority Data

Apr. 29, 2010 (EP) ..................................... 10161442
Feb. 23, 2011 (EP) ..................................... 11155600

(51) Int. Cl.
- *B08B 1/00* (2006.01)
- *A47L 13/16* (2006.01)
- *B32B 5/32* (2006.01)
- *B32B 7/06* (2006.01)

(Continued)

(52) U.S. Cl.
CPC ................. *B08B 1/006* (2013.01); *A47L 13/16* (2013.01); *B32B 1/00* (2013.01); *B32B 5/32* (2013.01); *B32B 7/06* (2013.01); *B32B 7/08* (2013.01); *B32B 7/12* (2013.01); *B32B 2250/22* (2013.01); *B32B 2266/02* (2013.01);

(Continued)

(58) Field of Classification Search
CPC .......... C08J 9/141; C08J 9/32; C08J 2203/14; C08J 2205/05; C08J 2361/28; C08J 2433/06; C08J 2461/28; C08J 2463/00; C08J 2467/00; C08J 2469/00; C08J 2475/04; C08J 2477/00; A47L 13/16; B08B 1/006; B32B 1/00; B32B 5/32; B32B 7/06; B32B 7/08; B32B 7/12; B32B 2250/22; B32B 2266/02; B32B 2266/025; B32B 2266/0264; B32B 2266/0278; B32B 2266/0285; B32B 2266/06; B32B 2307/54; B32B 2307/706
See application file for complete search history.

(56) References Cited

U.S. PATENT DOCUMENTS

| 4,334,971 A * | 6/1982 | Mahnke et al. ............... 521/136 |
| 2005/0136238 A1 | 6/2005 | Lindsay et al. |

(Continued)

FOREIGN PATENT DOCUMENTS

| EP | 1 808 116 A1 | 7/2007 |
| JP | 2003 160687 A | 6/2003 |

(Continued)

OTHER PUBLICATIONS

Extended European Search Report; Application No. 11155600.7-1712/2382907; dated Jan. 29, 2014; 9 pages.

*Primary Examiner* — Irina S Zemel
(74) *Attorney, Agent, or Firm* — Larry L. Huston; Steven W. Miller

(57) ABSTRACT

The present invention relates to a cleaning implement comprising elastic compressed foam and to a method of cleaning a hard surface with said cleaning implement.

10 Claims, 1 Drawing Sheet

(51) Int. Cl.
 *B32B 7/08* (2006.01)
 *B32B 7/12* (2006.01)
 *B32B 1/00* (2006.01)
(52) U.S. Cl.
 CPC .. *B32B 2266/025* (2013.01); *B32B 2266/0264* (2013.01); *B32B 2266/0278* (2013.01); *B32B 2266/0285* (2013.01); *B32B 2266/06* (2013.01); *B32B 2307/54* (2013.01); *B32B 2307/706* (2013.01); *B32B 2432/00* (2013.01); *Y10T 156/10* (2015.01)

(56) References Cited

U.S. PATENT DOCUMENTS

2006/0005338 A1    1/2006   Ashe et al.
2011/0265817 A1   11/2011   Gonzales et al.

FOREIGN PATENT DOCUMENTS

WO     WO-01/94436 A2    12/2001
WO    WO 2007/101881 A2    9/2007

* cited by examiner

CLEANING IMPLEMENT COMPRISING ELASTIC COMPRESSED FOAM

TECHNICAL FIELD

The present invention relates to a cleaning implement comprising elastic compressed foam.

BACKGROUND OF THE INVENTION

Open-cell foams and in particular melamine-formaldehyde resin foams (also referred to herein as melamine foams) are well known in the art for use in industrial applications, for example, as heat or sound insulating materials as well as for fire protection purposes. Indeed, in the automotive industry, open-cell foams are commonly used to insulate motor compartments and driver cabins of cars and trucks.

Recently, a novel application for such open-cell foams in the area of hard surface cleaning has been discovered. Indeed, cleaning implements of cut or molded pieces of such open-cell foam, and in particular melamine foam, have become popular to remove soils and/or stains from hard surfaces (i.e., cleaning of hard surfaces) such as tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on. Indeed, melamine foam sponges are currently marketed under the tradename Mr. Clean Magic Eraser®.

It is has been observed that open-cell foam (and melamine foam in particular) shows good soil and/or stain removal performance when used to clean hard surfaces, on stains/soils such as marks on walls and furniture. Indeed, it has been observed that open-cell foams (and melamine foam in particular) when wetted with an appropriate solvent, such as tap water, removes soils and/or stains from a hard surface when said hard surface is brought into contacted with said wetted modified open-cell foam. By "bringing into contact" it is meant wiping, swiping, rubbing or the like. In order for the open-cell foam (and melamine foam in particular) to optimally remove soils and/or stains from hard surfaces substantial amounts of an appropriate solvent, such as tap water, have to be used. Most commonly, tap water is used by the users of melamine foam when removing soils and/or stains from hard surfaces. When used with water or any other appropriate solvent, the open-cell foam (and melamine foam in particular) comes off as small particles (meaning, the foam crumbles) when brought into contact with a hard surface. Indeed, a milky suspension of small modified open-cell foam (and melamine foam in particular) particles in water is formed. However there has been the need for better soil and/or stain removal with better durability upon use.

It is therefore, an objective of the present invention to provide a cleaning implement based on inventive foam, wherein said implement is capable of (improved) cleaning greasy soap scum soils and neat kitchen dirt (grease) from hard surfaces and at the same time shows excellent durability upon use.

It has now been found that the above objective can be met by the use of elastic compressed foam according to the present invention to clean hard surfaces. Indeed, the objectives are met by the cleaning implement according to the present invention comprising such elastic compressed foam, the method of cleaning hard surfaces with such a cleaning implement or the method of cleaning hard surfaces with the inventive foams.

SUMMARY OF THE INVENTION

A present invention relates to a cleaning implement (1) based on melamine-formaldehyde foam characterized in that said foam comprises elastic compressed foam (2) based on melamine-formaldehyde resins obtained by a process comprising the steps of:
  a) Expanding a melamine-formaldehyde precondensate;
  b) Compressing the soft, not finally cured melamine-formaldehyde foamed material of step a), wherein compression take place in the range of 1 to 90%;
  c) Drying the elastic compressed melamine-formaldehyde material of step b); and density of elastic compressed foam is in the range of 5 to 100 g/l.

The present invention further encompasses a method of cleaning a hard surface with a cleaning implement according to the present invention.

DESCRIPTION OF THE REFERENCE NUMERALS

Figure 1:
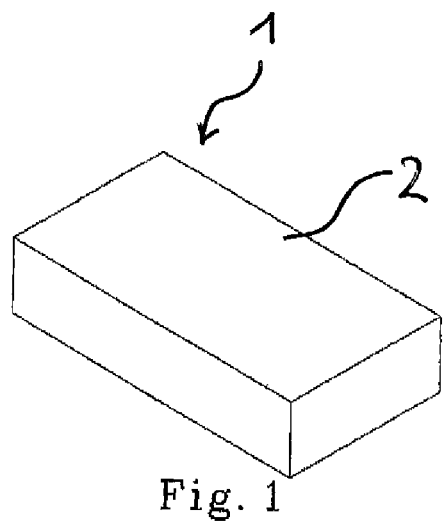
FIG. 1 is a perspective view of a cleaning implement (1).

1: Cleaning implement
2: Elastic compressed foam layer
3: Layer of second foam.
4: Line indicating the separation of the two layers

DETAILED DESCRIPTION OF THE INVENTION

Cleaning Implement

The cleaning implement (1) herein comprises elastic compressed foam produced by process as described herein below.

By a "cleaning implement" it is meant herein an article of manufacture of any suitable shape and/or size and/or volume suitable for cleaning, i.e., removing spots and/or stains from hard surfaces. In a highly preferred embodiment according to the present invention, the cleaning implement herein is in a shape and/or size and/or volume suitable for use by a consumer to clean hard surfaces therewith. Examples of cleaning implements are wipers, brushes, cleaning cloths or cleaning granules.

Suitable shapes of the cleaning implements (1), such as a wiper, herein may be selected from the group consisting of: cube shape, rectangular shape, pyramid shape, cylindrical shape, cone shape, pencil eraser shape, cuboid shape, tetrahedron shape; sphere shape; globular shape; and ellipsoid shape. Preferably, said cleaning implement has a shape selected from the group consisting of: cube shape, rectangular shape, pencil eraser shape, and cuboid shape.

Suitable volumes of the cleaning implements herein may be from 1 cm³ to 10,000 cm³, preferably from 10 cm³ to 1,000 cm³, more preferably from 150 cm³ to 250 cm³.

In a highly preferred embodiment herein, the cleaning implement (1) herein has a cuboid shape defined by three groups of parallel and equal length sides, referred to as a, b and c, wherein a ranges from 2 cm to 20 cm, preferably 4 cm to 8 cm, b ranges from 2 cm to 20 cm preferably 8 cm to 15 cm, and c ranges from 1.5 cm to 5 cm, preferably 2 cm to 4 cm.

In a preferred embodiment according to present invention, the thickness of said elastic compressed foam (2) layer is from 5 mm to 100 mm, preferably from 7 mm to 50 mm, more preferably 10 mm to 50 mm even more preferably from 15 mm to 50 mm, still more preferably from 20 mm to 40 mm.

The cleaning implement (1) of a first embodiment of the present invention as shown in FIG. 1 comprises a single layer (2) of elastic compressed foam.

In a preferred embodiment according to the present invention the cleaning implements herein may comprise additional layers of material. Preferably, in the cleaning implement herein said elastic compressed foam (2) forms a first layer and said cleaning implement additionally comprises a second layer of material. Even more preferably, said second layer of material is a second foam layer (3) made of a second foam material as discussed herein below. Such a cleaning implement according to this preferred embodiment is shown in FIG. 2.

The layers of elastic compressed foam (2) and second foam (3) may be arranged in said cleaning implement in any way suitable. In a preferred embodiment according to present invention the layers of elastic compressed foam (2) and second foam (3) are arranged parallel to at least one side, preferably two opposite sides, of the cleaning implement. However, the cleaning implement may also have an irregular shape. Indeed, the thickness of the layers may be constant or vary throughout the cleaning implement. The separation line (4) between the two layers may form a straight line or may form a bend or be completely irregular. In addition, the separation plane of the layers may be in the center of cleaning implement, dividing the implement in two equal parts, or may be in the upper or lower part of the implement. In addition, the cleaning implement may be in the shape of a sphere or a globule or an ellipsoid with the separation plane of the layers forming a spherical segment or one of the layers, preferably the layer of a second foam here, forming a sphere in a sphere (similar to the layers of an onion).

Figure 2:
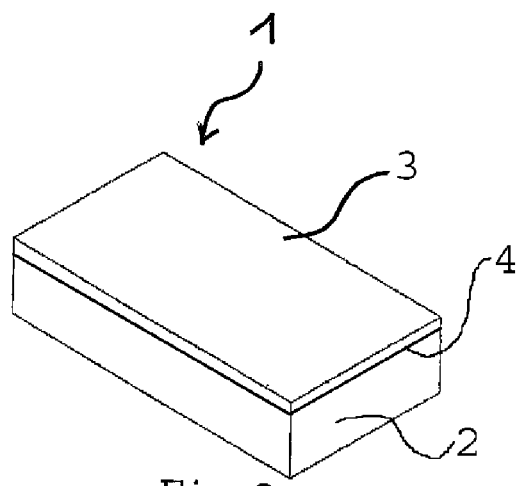
FIG. 2 is a perspective view of a cleaning implement comprising two layers.

In this highly preferred embodiment of the present invention, wherein the cleaning implement (1) herein has a cuboid shape, the line indicating the separation (4) of the two layers (or the surface areas where the two layers are joined together) of the implement is preferably substantially parallel (preferably parallel) to the side of the cuboid shaped implement having the largest surface area (as shown in FIG. 2).

In another highly preferred embodiment herein the cleaning implement herein is in the shape of a pencil eraser. By "shape of a pencil eraser" it is meant herein a voluminous body having six walls, wherein three pairs of parallel and equally shaped and sized walls exist and wherein one pair of walls are in the shape of a parallelogram and the remaining two pairs of walls are of rectangular shape. In this preferred embodiment, wherein the cleaning implement herein has the shape of a pencil eraser, the line indicating the separation of the two layers (or the surface areas where the two layers are joined together) of the implement is preferably substantially parallel (preferably parallel) to the side of implement in the shape of a pencil eraser having the largest surface area.

In order to obtain suitable cleaning implements according to a preferred embodiment of the present invention, the elastic compressed foam layer (2) and the second layer of a second foam (3) have to be attached to each other. This attachment can be achieved by any attachment means suitable for joining the two layers. The attachment may be either a permanent attachment (wherein the two layers cannot be separated without inflicting substantial damage to the layers) or temporary attachment (wherein the two layers may be separated without inflicting substantial damage to the layers). Suitable attachment means providing a permanent attachment are selected from the group consisting of: foam flame laminating the two layers together; use of a permanent adhesive; sewing the two layers together; and needle-punching the two layers together; and combinations thereof. Suitable attachment means providing a temporary attachment are selected from the group consisting of: a weak adhesive; Velcro; and a water-based, water-soluble coating or adhesive; and combinations thereof.

In a preferred embodiment here, the attachment of layers herein is a permanent attachment.

Foam flame lamination is a continuous process that can adhere foams and additional materials, if any, to one or both sides of foam in a single pass. The process of flame lamination involves the passing of first foam (either the elastic compressed foam herein or the second foam herein) over an open flame, which creates a thin layer of molten foam/polymer. Second foam (either the second foam herein or the elastic compressed foam herein, depending on the first step) is pressed against the first foam while it is still in the molten state. Foams and additional material, if any, can be adhered to one or both sides of the foam in a single pass. Furthermore, additional passes are optional. The strength of the bond depends upon the foams and additional material, if any, selected and the processing conditions (i.e., gas type, flame height and spread, foam burn-off and nip pressure).

The cleaning implement according to the present invention may contain more than two layers, wherein said additional layers, if any, may be of the same or similar materials as the elastic compressed foam or said second foam, or may be made of another material having similar properties as said second foam or different properties therefore. Indeed, the cleaning implement herein may be in a so-called sandwich configuration, wherein three layers are present. In a preferred embodiment, wherein the cleaning implement herein is in a sandwich configuration, the middle layer may be said second foam and at least one of the two outer layers is elastic compressed foam with the second outer layer being either elastic compressed foam or another material providing other feature, such as abrasiveness or increased rigidity. In a highly preferred embodiment according to the present invention the cleaning implement herein comprises two outer layers of said elastic compressed foam (a) and an inner layer, preferably of a second foam material, as discussed herein below.

The layers of the cleaning implement according to the present invention may cover each other either partially or fully. By a "partial coverage" it is meant that at least one of the layers overlaps the other layer (or other layers, if any) and is not fully covered by said other layer (or other layers, if any). By a "full coverage" it is meant that the layers of the cleaning implement do fully cover each other and that none of the layers substantially overlap the other layer (or other layers, if any).

The ratio of said elastic compressed foam to said second foam in the cleaning implement according to the present invention is preferably from 20:1 to 1:20 by volume, more preferable from 10:1 to 1:10 by volume, even more preferably 5:1 to 1:1, still more preferably 5:1 to 2:1, and most preferably from 4:1 to 3:1 by volume.

In order to obtain suitable cleaning implements according to the present invention, the elastic compressed foam- and second foam-raw materials may have to be modified in shape and/or size. This modification can be done by any means known to those skilled in the art. Suitable means of modifying the shape and/or size of melamine foam- and second foam-raw materials may be selected from the group consisting of: cutting, breaking, and tearing, and combinations thereof.

Elastic Compressed Foam

The melamine resin foam can be formed at the boiling temperature of a blowing agent. The still soft, not finally cured melamine resin foam can subsequently be compressed by all the methods known to those skilled in the art. As the pressure-producing body, for example rolls or rams can be used. The melamine resin foam is subsequently dried and optionally conditioned.

The compression can take place optionally in the range of 1 to 90%, preferably 5 to 80%, more preferably 10 to 70% and most preferably 20 to 60%, relative to the starting height (foaming height). Depending on the compression, the densities of the elastic foamed materials are in the range of 5 to 100 g/L, preferably 10 to 50 g/L, more preferably 12 to 30 g/L.

These elastic, compressed melamine resin foamed materials can preferably exhibit anisotropic behavior, i.e. a directionally dependent mechanism (so-called anisotropy).

Processes for melamine-formaldehyde resins and their foams are known for example from WO-A 01/94436.

The foams according to the invention can be produced as follows:
1. Production of a solution or dispersion containing a precondensate of the foamed material to be produced and optionally further additional components,
2. Expansion of the precondensate by heating the solution or dispersion from step (1) to a temperature above the boiling temperature of the blowing agent, in order to obtain a foamed material,
3. Compression of the foamed material from step (2)
4. Final curing and drying of the foamed material obtained in step (3)

Through the process, the compression can take place during the foam production (i.e. in situ) without a later process step.

The melamine-formaldehyde precondensates have as a rule a molar ratio of formaldehyde to melamine of 5:1 to 1.3:1, preferably 3.5:1 to 1.5:1.

These melamine-formaldehyde condensation products can contain in addition to melamine, up to 50% by weight, preferably up to 20% by weight, of other thermoset formers and in addition to formaldehyde up to 50% by weight, preferably up to 20% by weight, of other aldehydes condensed in. However, an unmodified melamine-formaldehyde condensation product is preferred.

As thermoset former, for example alkyl- and aryl-substituted melamine, urea, urethanes, carboxamides, dicyanodiamide, guanidine, sulfamide, sulfonamides, aliphatic amines, glycols, phenol and its derivatives can be used.

As aldehydes, for example acetaldehyde, trimethylol acetaldehyde, acrolein, benzaldehyde, furfural, glyoxal, glutaraldehyde, phthalaldehyde, and terephthalaldehyde can be used. Further details about melamine-formaldehyde condensation products are found in Houben-Weyl, Methoden der organischen Chemie [Methods of Organic Chemistry], Vol. 14/2, 1963, pp. 319-402.

In a further preferred embodiment of the present invention, the melamine-formaldehyde precondensate is present in the mixture in an amount of 55 to 85% by weight, preferably 63 to 80% by weight.

In the production of the melamine-formaldehyde precondensate, alcohols, for example methanol, ethanol, or butanol can be added, in order to obtain partially or fully etherified condensates. Through the formation of the ether groups, the solubility of the melamine-formaldehyde precondensate and the mechanical properties of the finally cured material can be influenced.

As dispersing agent or emulsifier, anionic, cationic, and nonionic surfactants as well as mixtures thereof can be used.

Suitable anionic surfactants are for example diphenylene oxide sulfonates, alkane- and alkyl sulfonates, alkylnaphthalene sulfonates, olefin sulfonates, alkyl ether sulfonates, fatty alcohol sulfates, ether sulfates, a-ester sulfonates, acylaminoalkane sulfonates, acylisothionates, alkyl ether carboxylates, N-acylsarcosinates, alkyl- and alkyl ether phosphates. As nonionic surfactants, alkylphenol polyglycol ethers, fatty alcohol polyglycol ethers, fatty acid polyglycol ethers, alkanolamine soaps, ethylene oxide/propylene oxide block copolymers, amine oxides, glycerol fatty acid esters, sorbitan esters, and alkylpolyglycosides can be used. As cationic emulsifiers, e.g. alkyltriammonium salts, alkylbenzyldimethyl ammonium salts, and alkylpyridinium salts can be used.

The dispersion agents or emulsifiers can be used in amounts of 0.2 to 5% by weight, relative to the melamine-formaldehyde precondensate.

The dispersion agents or emulsifiers and/or protective colloids can in principle be added to the raw dispersion at any desired point in time, but they can also already be present in the solvent when the microcapsule dispersion is introduced.

As hardener, acid compounds can be used that catalyze the further condensation of the melamine resin. As a rule the amount of this hardener is 0.01 to 20% by weight, preferably 0.05 and [sic] 5% by weight, in each case relative to the precondensate. Suitable acid compounds are inorganic and organic acids, for example selected from the group composed of hydrochloric acid, sulfuric acid, phosphoric acid, nitric acid, formic acid, acetic acid, oxalic acid, toluenesulfonic acids, amidosulfuric acids, acid anhydrides, and mixtures thereof.

Depending on the selection of the melamine-formaldehyde precondensate, the mixture contains a blowing agent. The amount of the blowing agent in the mixture is governed as a rule by the desired density of the foamed material.

In the process according to the invention, in principle both physical and chemical blowing agents can be used (Encyclopedia of Polymer Science and Technology, Vol. 1, $3^{rd}$ edition, Additives chapter, pp. 203 to 218, 2003).

Suitable blowing agents are "physical" or "chemical" blowing agents. "Physical" blowing agents are understood here to mean volatile liquids or compressed gases that achieve their property as blowing agent by physical treatment (e.g. temperature, pressure). "Chemical" blowing agents are understood here to mean blowing agents that achieve their property as blowing agent by chemical reaction or chemical decomposition with the release of gas.

As "physical" blowing agents, for example hydrocarbons such as pentane, hexane, halogenated, in particular chlorinated and/or fluorinated hydrocarbons, for example methylene chloride, chloroform, trichloroethane, fluorochlorinated hydrocarbons, partially halogenated fluorochlorinated hydrocarbons (H-FCKW), alcohols, for example methanol, ethanol, n- or isopropanol, ethers, ketones, and esters, for example methyl formate, ethyl formate, methyl acetate or ethyl acetate, in liquid form or air, nitrogen, and carbon dioxide as gases are suitable.

As "chemical" blowing agents, for example isocyanates mixed with water, wherein carbon dioxide is released as an effective blowing agent, are suitable. Moreover carbonates and bicarbonates mixed with acids are suitable, which likewise produce carbon dioxide. Azo compounds such as e.g. azodicarbonamide are also suitable.

In a preferred embodiment of the present invention, the mixture additionally contains at least one blowing agent. This blowing agent is present in the mixture in an amount of 0.5 to 60% by weight, preferably 1 to 40% by weight, particularly preferred 1.5 to 30% by weight, relative to the melamine-formaldehyde precondensate. It is preferred to add a physical blowing agent with a boiling point between 0 and 80° C.

In a further embodiment according to the present invention, in addition to the melamine-formaldehyde precondensate of the foamed material to be produced, the mixture also contains an emulsifier as well as optionally a hardener and optionally a blowing agent.

In a further embodiment of the present invention the mixture is free of further additives. However, for many purposes it can be favorable to add 0.1 to 20% by weight, preferably 0.1 to 10% by weight, relative to the melamine-formaldehyde precondensate, of customary additives such as dyes, flame-proofing agents, UV stabilizers, agents for lowering the fire gas toxicity, or for promoting the carbonization.

It is also possible to add additives to the melamine-formaldehyde precondensate. The foamed materials in one embodiment of the present invention contain at least one additive from the group of dyes, fragrances, optical brighteners, UV absorbers, flame-proofing agents, and pigments. This additive is preferably distributed homogeneously in the foamed material.

As pigments, the common inorganic natural pigments (e.g. chalk) or synthetic pigments (e.g. titanium oxides), but also organic pigments can be used.

As flame-proofing additives, for example as intumescence-producing substances, alkali silicates, melamine, melamine polyphosphate, melamine cyanurate, aluminum hydroxide, magnesium hydroxide, ammonium polyphosphates, organic phosphates, or else flame-proofing halogen compounds are suitable. Likewise plasticizers, nucleating agents, IR absorbers such as carbon and graphite, aluminum oxide powders or $Al(OH)_3$, soluble and insoluble dyes, substances acting as biocides (such as fungicides) and pigments are suitable as additives.

In process step (2), the precondensate and optionally the carrier material is heated to expansion. A foamed material can be obtained by heating the solution or dispersion from step (1) to a temperature above the boiling point of the blowing agent used. The exact temperature to be used also depends on the blowing agent used (e.g. depends on its boiling point). The heating in step (2) can be carried out e.g. by using hot gases (such as air or inert gases) and/or a high-frequency radiation (e.g. microwaves).

The energy input through electromagnetic radiation can preferably take place, for example through high-frequency radiation with 5 to 400 kW, preferably 5 to 200 kW, particularly preferred 9 to 120 kW per kilogram of the mixture used, in a frequency range of 0.2 to 100 GHz, preferably 0.5 to 10 GHz. Magnetrons are suitable as a radiation source for dielectric radiation, wherein the radiation can take place with one or more magnetrons simultaneously.

The expandable melamine-formaldehyde resin can be compressed according to all methods known to those skilled in the art. As pressure-applying bodies, for example rolls or rams can be used.

In a preferred embodiment of the present invention, the elastic compressed melamine-formaldehyde resin foam can preferably be produced discontinuously.

For this purpose the flexible, not yet finally cured melamine-formaldehyde resin foam obtained from step (2) can be compressed to the desired density in a foam box with variable pressure settings with the aid of a ram and optionally a filling body (to fix the density).

In a further preferred embodiment of the present invention the melamine-formaldehyde resin foam can preferably be compressed in a continuous process, so that the previously expanded melamine resin is compressed directly.

For this purpose the flexible, not yet finally cured melamine-formaldehyde resin foam obtained from step (2) can be compressed for example by means of a roll fixed on the upper side of the foam channel. Alternatively several rolls, twin belts, or calenders arranged in series are also possible. Likewise the compressing from the upper side can be combined with a compressing from the sides and/or the underside of the foam channel.

The foamed materials produced are finally dried, wherein water and blowing agent remaining in the foamed material is removed.

The properties of the melamine-formaldehyde resin foam produced thereby result from the expandable melamine-formaldehyde resin used and the established raw density of the carrier material.

The melamine resin foams according to the present invention are used in the cleaning industry for the cleaning of surfaces e.g. in the form of sponges or impregnated with cleaning agents of all types i.a. for cleaning processes in (fully) automatic washers.

Second Foam

In a highly preferred embodiment herein, the cleaning implement (1) herein comprises (at least) one layer of a second foam (3).

Suitable second foams for use herein are selected from the group of foams consisting of: polyurethane foams; polypropylene foams; polyethylene foams; cellulose foam sponges; naturally occurring sponges; open-cell polyester foams; and cross-linked polyethylene foams; and combinations thereof.

The thickness of said layer of a second foam if any is preferably up to 30 mm, preferably from 0.5 mm to 20 mm, more preferably from 1 mm to 15 mm, even more preferably from 2 mm to 10 mm, and most preferably from 4 mm to 8 mm. Furthermore, in the preferred embodiment herein, wherein the cleaning implement comprises a layer of second foam the thickness of said elastic compressed foam (2) layer is preferably from 7 mm to 100 mm, more preferably from 15 mm to 25 mm.

In a preferred embodiment herein, the total volume of said layer of said second foam in the cleaning implement herein is preferably from 10 $cm^3$ to 100 $cm^3$, more preferably from 20 $cm^3$ to 70 $cm^3$, even more preferably from 30 $cm^3$ to 60 $cm^3$, and most preferably from 40 $cm^3$ to 50 $cm^3$.

Packaging Means

The cleaning implement herein may be combined in an article of manufacture with a packaging means.

The packaging means herein may be any suitable means known to package cleaning implements. Indeed, particularly suitable packaging means herein are selected from the group consisting of: paper bags, plastic bags, cartons, carton boxes, flow wraps, plastic wraps, and paper wraps, and the like and combinations thereof.

The packaging means herein may be printed and/or modified. In particular, such printing and/or other modification may be used to associate a brand-name and/or logo of a hard surface cleaner with said cleaning implement.

Method of Cleaning a Hard Surface

In another embodiment the present invention encompasses method of cleaning a hard surface with a cleaning implement as described herein above.

In yet another embodiment herein, the present invention encompasses a method of cleaning a hard surface by bringing a cleaning implement according to the present invention into contact with said hard surface. By "cleaning" it is meant herein removing spots and/or stains from hard surfaces.

In still another embodiment herein, the present invention encompasses a method of cleaning a hard surface with elastic compressed foam according to the present invention.

Suitable hard surfaces herein are tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on.

The methods of cleaning a hard surface according to the present invention may additionally include the step of wetting said cleaning implement or said elastic compressed foam with an appropriate solvent, preferably tap water, more preferably water in combination with a detergent composition, prior to bringing said cleaning implement into contact with said hard surface.

EXAMPLES

The following examples will further illustrate the present invention. The following Examples are meant to exemplify compositions according to the present invention but are not necessarily used to limit or otherwise define the scope of the present invention.

Example 1

75 parts by weight of a spray-dried melamine-formaldehyde precondensate (molar ratio 1:3) was dissolved in 25 parts by weight water. 3% by weight formic acid, 2% by weight of an Na—$C_{12}/C_{18}$-alkane sulfate, 20% by weight pentane, in each case relative to the resin, were added to this resin solution, stirred, and then expanded in a mold (for expansion) made of polypropylene through radiation of microwave energy. The flexible foamed material is compressed to half of the starting volume with the aid of a ram made of polypropylene and dried for 30 minutes.

Comparative Example A 75 parts by weight of a spray-dried melamine-formaldehyde precondensate (molar ratio 1:3) was dissolved in 25 parts by weight water. 3% by weight formic acid, 2% by weight of an Na—$C_{12}/C_{18}$-alkane sulfate, 20% by weight pentane, in each case relative to the resin, were added to this resin solution, stirred, then expanded in a mold (for expansion) made of polypropylene through radiation of microwave energy and dried for 30 minutes.

Comparative Example B

Analogous to U.S. Pat. No. 6,608,118, Example 1

75 parts by weight of a spray-dried melamine-formaldehyde precondensate (molar ratio 1:3) was dissolved in 25 parts by weight water. 3% by weight formic acid, 2% by weight of an Na—$C_{12}/C_{18}$-alkane sulfate, 20% by weight pentane, in each case relative to the resin, were added to this resin solution, stirred, then expanded in a mold (for expansion) made of polypropylene through radiation of microwave energy and dried for 30 minutes.

From the starting materials produced according to example 1 or the comparative examples A and B, a rectangular plate with the dimensions 200×200×40 mm was respectively compressed to half the starting volume in an electrically heated and temperature-controlled hydraulic plate press in the direction of the shortest space coordinate at 270° C. and 4 bar for 3 min.

The results are summarized in Table 1.

TABLE 1

|  | Density [g/L] | Ram pressure[1] [N/kN] | Tensile strength [kPa], EN ISO 1798 | Elongation at break [%], EN ISO 1798 |
|---|---|---|---|---|
| Example 1 | 18.2 |  |  |  |
| Horizontal |  | 57.2 | 176.7 | 21.8 |
| Vertical |  | 35.1 | 57.8 | 46.4 |
| Comparative example A | 8.9 |  |  |  |
| Horizontal |  | 28.2 | 125.2 | 21.3 |
| Vertical |  | 26.7 | 123.6 | 22.5 |
| Comparative example B | 18.1 |  |  |  |
| Horizontal |  | 43.2 | 143.9 | 14.7 |
| Vertical[2] |  | — | — | — |

[1] Ram pressure values were determined respectively on the larger surface of the test sample
[2] These values cannot be determined due to the geometry of the test sample.

The melamine resin foam from example 1 shows an anisotropy of the mechanical properties.

The horizontal cuts (perpendicular to the expansion direction and compression) from example 1 have distinctly higher ram pressure- and tensile strength values when compared to the non-compressed foam (Comparative example A) and the foam compressed later (Comparative example B). The elongation at break is comparable to the non-compressed melamine resin foam.

The vertical cuts (along the expansion direction and compressing) from example 1 show distinctly lower values when compared to the horizontal cuts from example 1. In contrast, the elongation at break of the vertical cut from example 1 has more than doubled (46.4%) when compared to the horizontal cut from example 1. In contrast, comparative example A exhibits an almost isotropic behavior, i.e. between horizontal and vertical cut there are scarcely any differences.

Ram Pressure Measurement

To evaluate the mechanical quality of the melamine resin foamed materials, a ram pressure measurement was carried out according to U.S. Pat. No. 4,666,948. A cylindrical ram with a diameter of 8 mm and a height of 10 cm was thereby pressed into a cylindrical sample with the diameter of 11 cm and a height of 5 cm in the expansion direction at an angle of 90° C. until the sample tears. The tearing force [N/kN] gives information about the quality of the foamed material.

Use of Inventive Modified Foams and of Unmodified Foams as Cleaning Implements or to Clean Hard Surfaces Cleaning Implement a A single layer cleaning implement having a cuboid shape defined by three groups of parallel and equal length sides, referred to as a, b and c, with a being 6.5 cm, b being 12 cm, and c being 3 cm is cut from elastic compressed foam according to present invention. The overall shape of cleaning Implement A is similar to the cleaning implement of FIG. 1.

Cleaning Implement A is used to clean hard surfaces. Indeed, Cleaning Implement A is wetted with water and thereafter brought into contact with the hard surface to be cleaned. Cleaning Implement A shows an excellent performance in removing greasy soap scum and neat kitchen dirt from said hard surface.

Cleaning Implement B

A dual layer cleaning implement having a cuboid shape defined by three groups of parallel and equal length sides, referred to as a, b and c, with a being 6.5 cm, b being 12 cm, and c being 4 cm is made by foam flame laminating a first layer of elastic compressed foam according to present invention, having a thickness—side c—of 2 cm to a second layer of commercially available polyurethane foam, having a thickness—side c—of 1 cm. The two layers are joined together at the plane formed by sides a and b. The overall shape of Cleaning Implement B is similar to the cleaning implement of FIG. 2.

Cleaning Implement B is used to clean hard surfaces. Indeed, Cleaning Implement B is wetted with water and thereafter the elastic compressed foam side of Cleaning Implement B is brought into contact with the hard surface to be cleaned by rubbing said side over the area to be cleaned. The excessive amount of water is thereafter absorbed by the polyurethane layer of Cleaning Implement B by swiping the cleaned surface with said layer. Cleaning Implement B shows an excellent performance in removing greasy soap scum and neat kitchen dirt from said hard surface.

Cleaning Implement C

A dual layer cleaning implement having a cuboid shape defined by three groups of parallel and equal length sides, referred to as a, b and c, with a being 6.5 cm, b being 12.5 cm, and c being 2.5 cm is made by a permanent adhesive a first layer of elastic compressed foam according to present invention, having a thickness—side c—of 2 cm to a second layer of commercially available polyurethane foam, having a thickness—side c—of 0.5 cm. The two layers are joined together at the plane formed by sides a and b. The overall shape of Cleaning Implement C is similar to the cleaning implement of FIG. 2.

Cleaning Implement C is used to clean hard surfaces. Indeed, Cleaning Implement C is wetted with water and thereafter the elastic compressed foam according to present invention side of Cleaning Implement C is brought into contact with the hard surface to be cleaned by rubbing said side over the area to be cleaned. The excessive amount of water is thereafter absorbed by the polyurethane layer of Cleaning Implement C by swiping the cleaned surface with said layer. Cleaning Implement C shows an excellent performance in removing greasy soap scum and neat kitchen dirt from said hard surface.

Use of Elastic Compressed Foam According to Present Invention to Clean a Hard Surface A piece of elastic compressed foam according to present invention is used to clean a hard surface by wetting a piece of said foam with water and thereafter bringing it into contact with the hard surface to be cleaned. The elastic compressed foam according the present invention shows an excellent performance in removing greasy soap scum and neat kitchen dirt from said hard surface.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a cleaning implement based on melamine-formaldehyde foam, wherein said foam comprises elastic compressed foam based on melamine-formaldehyde resins obtained by a process comprising the steps of:
   a) Providing a melamine-formaldehyde precondensate and expanding the precondensate to a soft, not finally-cured melamine-formaldehyde foamed material;
   b) Compressing the soft, not finally cured melamine-formaldehyde foamed material of step a), in the range of about 1 to about 90% to yield an elastic compressed melamine-formaldehyde material;
   c) Drying the elastic compressed melamine-formaldehyde material of step b) to form at least two elastic compressed foam layers having a density in the range of about 5 to about 100 g/l;
   d) Providing a third layer of melamine-formaldehyde material comprising a foam material which is not compressed; and
   d) Joining three layers of melamine-formaldehyde material, to yield a cleaning implement comprising two outer layers of said elastic compressed foam and an inner layer of melamine-formaldehyde material.

2. A method according to claim 1, wherein said cleaning implement has a thickness of at least 15 mm.

3. A method according to claim 2, wherein said elastic compressed melamine-formaldehyde material has a shape selected from the group consisting of: cube shape, rectangular shape, pyramid shape, cylindrical shape, cone shape, pencil eraser shape, cuboid shape, and tetrahedron shape.

4. A method according to claim 3, wherein said elastic compressed melamine-formaldehyde material has a volume of from 1 cm3 to 10,000 cm3 upon drying.

5. A method according to claim 1, wherein said layer of elastic compressed foam and said third layer are joined by means of a permanent attachment or a temporary attachment.

6. A method according to claim 5, wherein said layer of said elastic compressed foam and said third layer of a second foam are joined by an attachment means providing a permanent attachment selected from the group consisting of foam flame laminating the two layers together; use of a permanent adhesive; sewing the two layers together; and needle-punching the two layers together; and combinations thereof.

7. A method according to claim 1, wherein the thickness of said elastic compressed foam layer is from about 5 mm to about 100 mm.

8. A method according to claim 1, wherein said cleaning implement further comprises a foam layer made of a foam material selected from the group consisting of polyurethane foams, polypropylene foams, polyethylene foams, cellulose foam sponges, naturally occurring sponges, open-cell polyester foams, cross-linked polyethylene foams, and combinations thereof.

9. A method according to claim 1, wherein said elastic compressed foam comprises at least one additive selected from the group consisting of biocides, abrasive materials, filler materials, surfactants, colorants, lubricants, cross-linkers, fragrances, plasticizers, odor scavengers, microcapsules and combinations thereof.

10. A method of cleaning a hard surface using a cleaning implement according to claim 1.

* * * * *